US010718968B2

United States Patent
Shin et al.

(10) Patent No.: US 10,718,968 B2
(45) Date of Patent: Jul. 21, 2020

(54) DISPLAY DEVICE AND METHOD FOR MANUFACTURING THE SAME

(71) Applicant: LG Display Co., Ltd., Seoul (KR)

(72) Inventors: Heesun Shin, Paju-si (KR); Seok Woo Lee, Bucheon-si (KR); Jae Sung Yu, Seoul (KR); Ju Han Kim, Bucheon-si (KR); Sun Jung Lee, Seoul (KR); In Hyuk Song, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 22 days.

(21) Appl. No.: 15/970,716

(22) Filed: May 3, 2018

(65) Prior Publication Data

US 2018/0252956 A1 Sep. 6, 2018

Related U.S. Application Data

(63) Continuation of application No. 15/156,243, filed on May 16, 2016, now Pat. No. 9,977,274, which is a
(Continued)

(30) Foreign Application Priority Data

Dec. 22, 2011 (KR) .......................... 10-2011-0140094

(51) Int. Cl.
*G02F 1/1333* (2006.01)
*G06F 3/041* (2006.01)
(Continued)

(52) U.S. Cl.
CPC ........ *G02F 1/13338* (2013.01); *G02F 1/1368* (2013.01); *G02F 1/13439* (2013.01);
(Continued)

(58) Field of Classification Search
CPC ........... G02F 1/13338; G02F 1/133345; G02F 1/133514; G02F 1/134309; G02F 1/13439;
(Continued)

(56) References Cited

U.S. PATENT DOCUMENTS 5,392,058 A 2/1995 Takao
6,323,846 B1 * 11/2001 Westerman ........... G06F 3/0235
345/173
(Continued)

FOREIGN PATENT DOCUMENTS

CN 1014446715 A 6/2009
CN 101681221 A 3/2010
(Continued)

OTHER PUBLICATIONS

Office Action dated Jul. 28, 2015 for corresponding Korean Patent Application No. 10-15-0060014, 6 pages.
(Continued)

*Primary Examiner* — Nathanael R Briggs
(74) *Attorney, Agent, or Firm* — Morgan, Lewis & Bockius LLP

(57) ABSTRACT

Disclosed is an LCD device which realizes decreased thickness, simplified process, and decreased cost by using a common electrode for formation of electric field to drive liquid crystal as a sensing electrode, and removing a touch screen from an upper surface of the liquid crystal panel, the LCD device comprising gate and data lines crossing each other to define plural pixels on a lower substrate; a pixel electrode in each of the plural pixels; plural common electrode blocks patterned at the different layer from the pixel electrode, wherein the common electrode blocks, together with the pixel electrode, forms an electric field, and senses a user's touch; and plural sensing lines electrically con-
(Continued)

nected with the common electrode blocks, wherein, if the sensing line is electrically connected with one of the common electrode blocks, the sensing line is insulated from the remaining common electrode blocks.

27 Claims, 15 Drawing Sheets

Related U.S. Application Data continuation of application No. 13/722,366, filed on Dec. 20, 2012, now Pat. No. 9,759,940.

(51) Int. Cl.
| | |
|---|---|
| *G06F 3/044* | (2006.01) |
| *G02F 1/1335* | (2006.01) |
| *G02F 1/1343* | (2006.01) |
| *G02F 1/1362* | (2006.01) |
| *G02F 1/1368* | (2006.01) |
| *G06F 3/047* | (2006.01) |

(52) U.S. Cl.
CPC .. *G02F 1/133345* (2013.01); *G02F 1/133514* (2013.01); *G02F 1/134309* (2013.01); *G02F 1/136286* (2013.01); *G06F 3/041* (2013.01); *G06F 3/044* (2013.01); *G06F 3/047* (2013.01); *G06F 3/0412* (2013.01); *G02F 2001/133302* (2013.01); *G02F 2001/134372* (2013.01); *G02F 2001/136295* (2013.01); *G06F 2203/04103* (2013.01)

(58) Field of Classification Search
CPC ............ G02F 1/136286; G02F 1/1368; G02F 2001/133302; G02F 2001/134372; G02F 2001/136295; G06F 3/041; G06F 3/0412; G06F 3/044; G06F 3/047; G06F 2203/04103
See application file for complete search history.

(56) References Cited

U.S. PATENT DOCUMENTS

| | | |
|---|---|---|
| 2001/0007779 A1 | 7/2001 | Lee et al. |
| 2004/0032557 A1 | 2/2004 | Lee et al. |
| 2006/0097991 A1 | 5/2006 | Hotelling |
| 2007/0171319 A1 | 7/2007 | Fujita et al. |
| 2007/0195029 A1 | 8/2007 | Jeon et al. |
| 2009/0141209 A1 | 6/2009 | Chen et al. |
| 2009/0174681 A1 | 7/2009 | Chang et al. |
| 2010/0149126 A1 | 6/2010 | Futter |
| 2010/0182273 A1 | 7/2010 | Noguchi et al. |
| 2010/0194698 A1 | 8/2010 | Hotelling et al. |
| 2010/0194707 A1 | 8/2010 | Hotelling et al. |
| 2010/0330468 A1 | 12/2010 | Kwon et al. |
| 2011/0025644 A1 | 2/2011 | Lin et al. |
| 2011/0051057 A1 | 3/2011 | Song et al. |
| 2011/0157039 A1 | 6/2011 | Shin et al. |
| 2011/0227851 A1 | 9/2011 | Oh et al. |
| 2011/0228188 A1* | 9/2011 | Kim .................... G02F 1/13338 349/43 |
| 2011/0249207 A1 | 10/2011 | Segawa et al. |
| 2012/0044178 A1 | 2/2012 | Song |
| 2012/0086654 A1 | 4/2012 | Song |
| 2012/0242612 A1* | 9/2012 | Chang .................. G06F 3/0416 345/174 |
| 2013/0300953 A1 | 11/2013 | Hotelling et al. |
| 2015/0212627 A1* | 7/2015 | Hotelling .............. G06F 3/0362 345/174 |

FOREIGN PATENT DOCUMENTS

| | | |
|---|---|---|
| CN | 101968590 A | 2/2011 |
| CN | 102109722 A | 6/2011 |
| EP | 2357513 A1 | 8/2011 |
| JP | 2008233853 A | 10/2008 |
| KR | 20010063293 A | 7/2001 |
| KR | 20040061594 A | 7/2004 |
| KR | 20070078389 A | 7/2007 |
| KR | 1020070082959 A | 8/2007 |
| KR | 20110075411 A | 7/2011 |
| KR | 1020110101387 A | 9/2011 |
| TW | 201031961 A | 9/2010 |
| TW | 201104542 A | 2/2011 |

OTHER PUBLICATIONS

Office Action issued in Taiwanese Patent Application No. 101149190, dated Dec. 22, 2014, 14 pages.
Office Action issued in Chinese Patent Application No. 201210520929.8, dated Dec. 23, 2014, 18 pages.
Office Action for U.S. Appl. No. 13/722,366, dated May 20, 2016, 13 pages.
Office Action for U.S. Appl. No. 13/722,366, dated Sep. 29, 2015, 17 pages.
Office Action for U.S. Appl. No. 13/722,366, dated May 7, 2015, 15 pages.
Office Action for U.S. Appl. No. 13/722,366, dated Feb. 12, 2015, 14 pages.
Office Action for U.S. Appl. No. 13/722,366, dated Dec. 15, 2016, 12 pages.

* cited by examiner

DISPLAY DEVICE AND METHOD FOR MANUFACTURING THE SAME

CROSS REFERENCE TO RELATED APPLICATIONS

This application is a continuation of U.S. patent application Ser. No. 15/156,243, filed on May 16, 2016, which is a continuation of U.S. patent application Ser. No. 13/722,366, filed on Dec. 20, 2012, now U.S. Pat. No. 9,759,940, which claims the benefit of Korean Patent Application No. 10-2011-0140094, filed on Dec. 22, 2011. All of the above prior U.S. Patent, and U.S. and Korean Patent Applications are hereby incorporated by reference as if fully set forth herein.

BACKGROUND

Field of the Disclosure

The present disclosure relates to a liquid crystal display (LCD) device, and more particularly, to a liquid crystal display (LCD) devise with a sensing electrode for sensing a user's touch.

Discussion of the Related Art

Owing to advantages such as good portability and low power consumption by low operating voltage, a liquid crystal display (LCD) device is widely used in various fields of notebook computer, monitor, spacecraft, aircraft, etc.

The LCD device includes a lower substrate, an upper substrate, and a liquid crystal layer formed between the fewer and upper substrates. According to whether or not an electric field is applied, light transmittance is controlled by alignment of the liquid crystal layer, to thereby display images.

Generally, the LCD device is provided with input means such as mouse or keyboard. However, in case of navigation, portable terminal and home appliances, a touch screen is typically used, which enables to directly input information to a screen through the use of finger or pen.

A related art LCD device with a touch screen applied thereto will be described below.

FIG. 1 is a cross sectional view of an LCD device according to the related art. As shown in FIG. 1, the LCD device according to the related art includes a liquid crystal panel 10 and a touch screen 20.

The liquid crystal panel 10 is provided to display images thereon, wherein the liquid crystal panel 10 includes a lower substrate 12, an upper substrate 14, and a liquid crystal layer 16 between the lower and upper substrates 12 and 14.

The touch screen 20 is formed on an upper surface of the liquid crystal panel 10, to thereby sense a user's touch. The touch screen 20 includes a touch substrate 22, a first sensing electrode 24 on a lower surface of the touch substrate 22, and a second sensing electrode 26 on an upper surface of the touch substrate 22.

The first sensing electrode 24 is arranged in a horizontal direction on the lower surface of the touch substrate 22, and the second sensing electrode 26 is formed in a vertical direction on the upper surface of the touch substrate 22. If a user touches a predetermined position, a capacitance between the first sensing electrode 24 and the second sensing electrode 26 is changed at the touched position. Thus, it is possible to sense the user's touch by sensing the touched position with the changed capacitance.

However, since the LCD device according to the related art is formed in a structure with the touch screen 20 additionally provided on the upper surface of the liquid crystal panel 10, it may cause disadvantages such as a decreased total thickness of the device, a complicated manufacturing process and an increased manufacturing cost.

SUMMARY

An LCD device comprises: gate and data lines crossing each other to define plural pixels on a lower substrate; a pixel electrode in each of the plural pixels; plural common electrode blocks patterned at the different layer from the pixel electrode, wherein the common electrode blocks, together with the pixel electrode, forms an electric field, and senses a user's touch; and plural sensing lines electrically connected with the common electrode blocks, wherein, if the sensing line is electrically connected with one of the common electrode blocks, the sensing line is insulated from the remaining common electrode blocks.

In another aspect, there is provided an LCD Device comprising: an active area of a lower substrate including gate and data lines crossing each other to define a plurality of pixels; a transistor in each of the pixels; a pixel electrode in each of the pixels; plural common electrode blocks formed at the different layer from the pixel electrode, wherein the common electrode blocks, together with the pixel electrode, forms an electric field, and senses a user's touch; and plural sensing lines electrically connected with the common electrode blocks; a dummy area along the edge of the active area; and a blocking layer on a semiconductor layer of the transistor formed in the active area and the dummy area, the blocking layer for blocking ultraviolet rays, wherein, if the sensing line is electrically connected with one of the common electrode blocks, the sensing line is insulated from the remaining common electrode blocks.

In another aspect, there is provided a method for manufacturing an LCD device comprising: sequentially forming a gate electrode, a gate insulating film, a semiconductor layer, a source electrode, a drain electrode, and a first passivation layer on a lower substrate; forming a pixel electrode after forming a pixel electrode contact hole in the first passivation layer, and electrically connecting the pixel electrode and the drain electrode with each other through the pixel electrode contact hole; forming plural sensing lines in a predetermined direction, wherein the sensing line is formed on the first passivation layer, and is provided at a predetermined interval from the pixel electrode; forming a second passivation layer on the pixel electrode and the sensing line, and forming a common electrode contact hole so as to make the sensing line connected with one of plural common electrode blocks, and simultaneously make the sensing line insulated from the remaining common electrode blocks; and forming the common electrode block on the second passivation layer so as to electrically connect the sensing line and the common electrode block with each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a liquid crystal display (LCD) device according to the present invention and a method for manufacturing the same will be described with reference to the accompanying drawings.

On explanation about the embodiments of the present invention, if it is mentioned that a first structure is positioned 'on or above' or 'under or below' a second structure, it should be understood that the first and structures are brought into contact with each other, or a third structure is interposed between the first and second structures.

Liquid Crystal Display (LCD) Device

Figure 1:
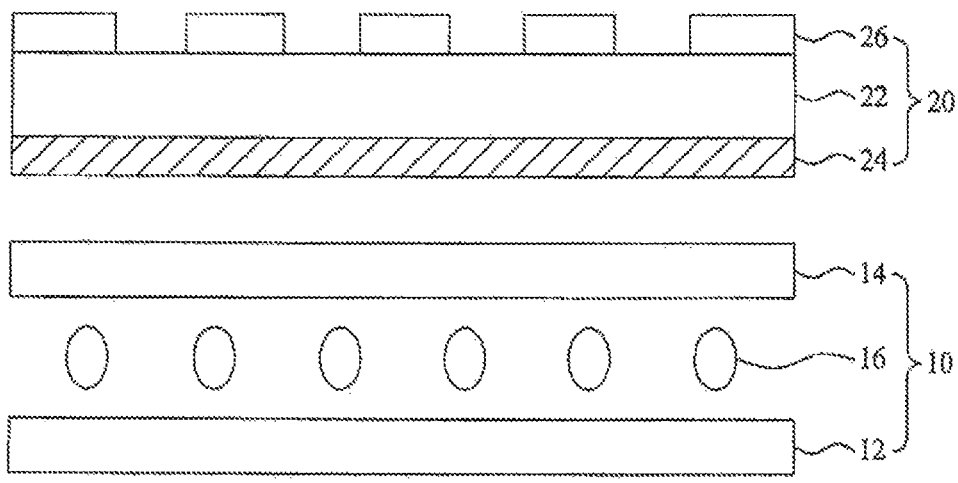
FIG. 1 is a cross sectional view of an LCD device according to the related art.
Figure 2A:
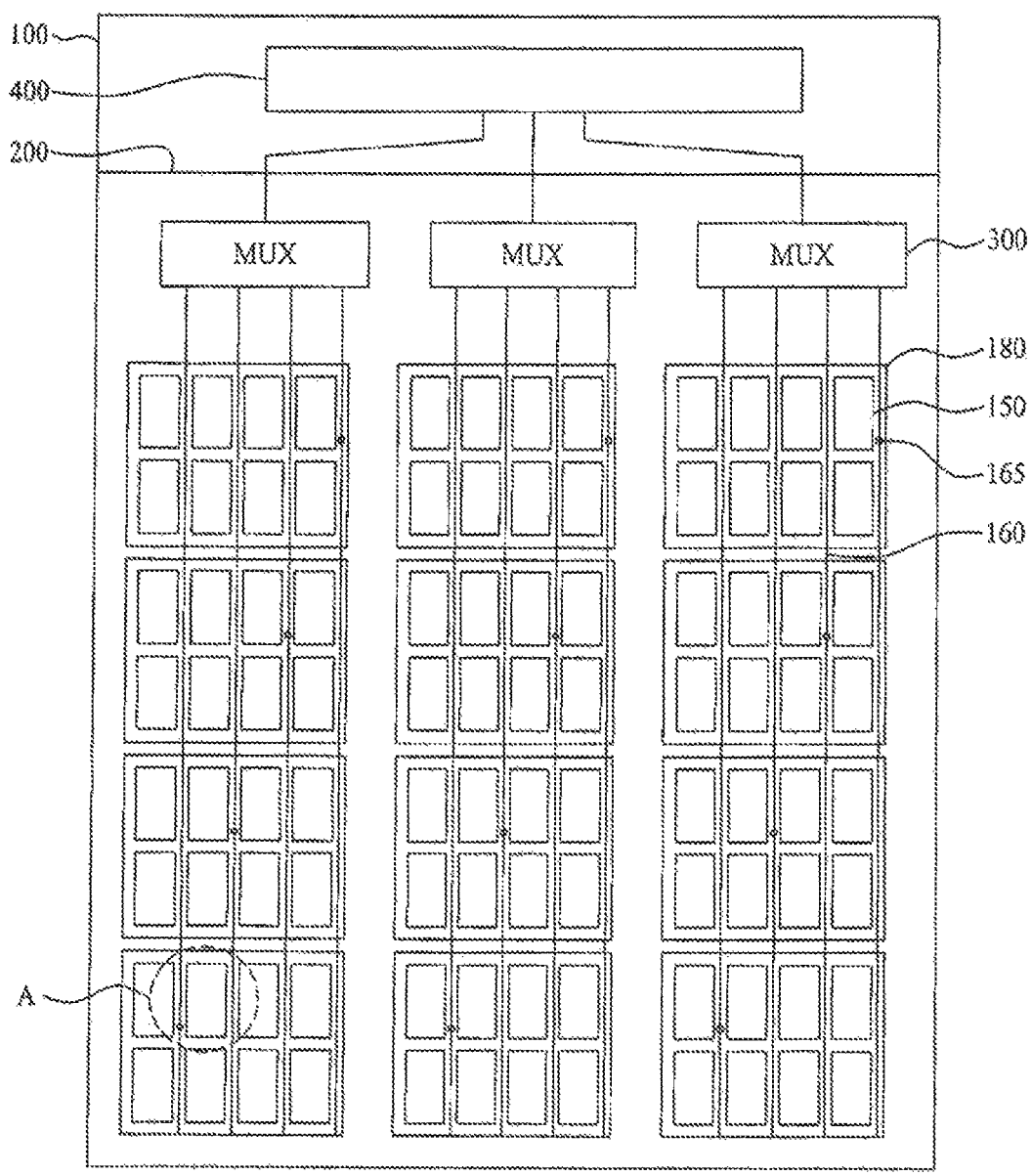
FIG. 2A is a plane view of a lower substrate for an LCD device according to one embodiment of the present invention.
Figure 2B:
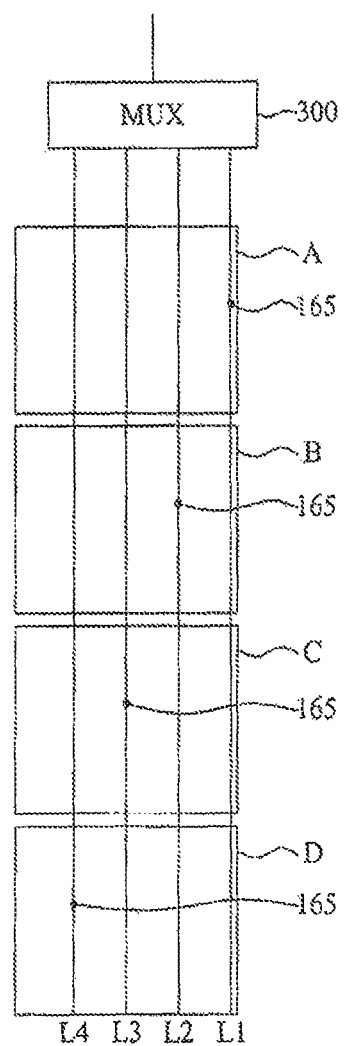
FIG. 2B shows a principle of sensing a user's touch position in a sensing line according to an embodiment of the present invention.
Figure 3:
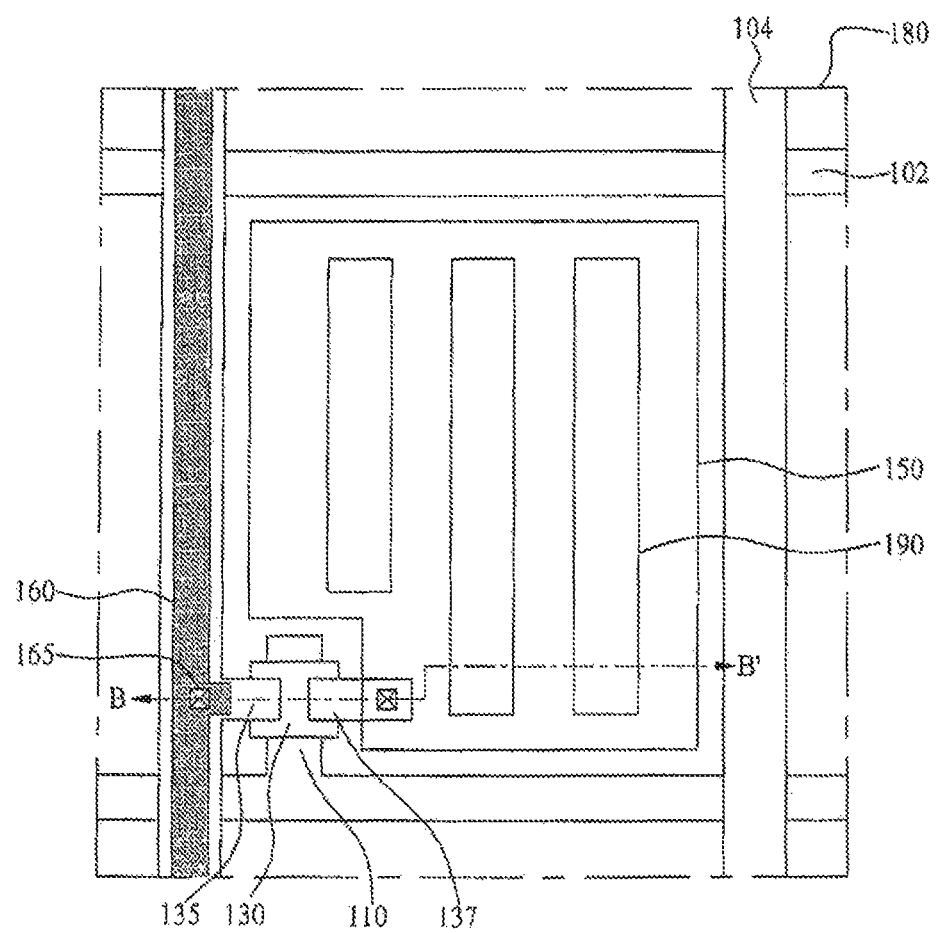
FIG. 3 is an expanded view showing 'A' of FIG. 2A.

FIG. 2A is a plane view of a lower substrate for an LCD device according to one embodiment of the present invention, FIG. 2B shows a principle of sensing a user's touch position in a sensing line according to the present invention, and FIG. 3 is an expanded view showing 'A' of FIG. 2A.

As shown in FIGS. 2A and 3, the LCD device according to the present invention includes a lower substrate 100, a gate line 102, a data line 104, a gate electrode 110, a semiconductor layer 130, a source electrode 135, a drain electrode 137, a pixel electrode 150, a sensing line 160, a common electrode contact hole 165, a common electrode block 180, a slit 190, an upper substrate 200, a multiplexer 300, and a sensing circuit 400.

The lower substrate 100 may be formed of glass or transparent plastic.

The gate line 102 is arranged along a horizontal direction on the lower substrate 100, and the data line 104 is arranged along a vertical direction on the lower substrate 100. The gate line 102 and the data line 104 cross each other, to thereby define a plurality of pixels.

Both the gate line 102 and the data line 104 are formed in straight-line shapes, but not necessarily. For example, the data line 104 may be formed in a curved-line shape.

A thin film transistor, which functions as a switching element, is formed in each of the pixels. The thin film transistor includes the gate electrode 110, the semiconductor layer 130, the source electrode 135, and the drain electrode 137. The thin film transistor may be formed in a bottom gate structure where the gate electrode 110 is positioned below the semiconductor layer 130, or may be formed in a top gate structure where the gate electrode 110 is positioned above the semiconductor layer 130.

The pixel electrode 150 is formed in each of the pixels. Especially, the pixel electrode 150 is formed in a shape corresponding to that of the pixel.

The common electrode block 180 and the pixel electrode 150 are formed at different layers. Thus, the common electrode 180, together with the pixel electrode 150, forms an electric field so as to drive liquid crystal and simultaneously functions as a sensing electrode for sensing a user's touch position.

In order to use the common electrode block 180 as the sensing electrode, the plurality of common electrode blocks 180 are patterned. The plurality of common electrode blocks 180 may be formed in a size corresponding to a size of one or more pixels. Herein, the size of common electrode blocks 180 deeply affects touch resolution of the LCD device. That is, the touch resolution of the LCD device is highly affected by the number of pixels to be corresponding to the size of common electrode blocks 180.

If an area corresponding to a large number of pixels is provided for one common electrode block 180, the touch resolution is lowered to that extent. Meanwhile, an area corresponding to a small number of pixels is provided for one common electrode block 180, the touch resolution is improved, however, the number of sensing lines 160 is increased.

The sensing line 160 applies an electrical signal to the plural common electrode blocks 180. That is, the plural common electrode blocks 180 are connected with the sensing line 160. At an end of the sensing line 160, there is the sensing circuit 400 for sensing the user's touch position.

If the sensing line 160 is electrically connected with one of the common electrode blocks 180, the sensing line 160 is insulated from the remaining common electrode blocks 180, to thereby sense the user's touch position.

For a detailed explanation, FIG. 2B illustrates the four common electrode blocks (A, B, C, D) 180 and the four sensing lines 160.

As shown in FIG. 2B, the sensing line (L1) 160 is connected with the common electrode block (A) 180, an is insulated from the other common electrode blocks (B, C, D) 180. Thus, if the user touches the common electrode block (A) 180, this signal is transmitted to the sensing line (L1) 160, to thereby sense the user's touch position.

In the same manner, the sensing line (L2) 160 is connected with the common electrode block (B) 180, and is insulated from the other common electrode blocks (A, C, D) 180. Thus, if the user touches the common electrode block (B) 180, this signal is transmitted to the sensing line (L2) 160, to thereby sense the user's touch position.

The sensing line (L3) 160 is connected with the common electrode block (C) 180, and is insulated from the other common electrode blocks (A, B, D) 180. Thus, if the user touches the common electrode block (C) 180, this signal is transmitted to the sensing line (L3) 160, to thereby sense the user's touch position.

The sensing line (L4) 160 is connected with the common electrode block (D) 180, and is insulated from the other common electrode blocks (A, B, C) 180. Thus, if the user touches the common electrode block (D) 180, this signal is transmitted to the sensing line (L4) 160, to thereby sense the users touch position.

As described above, if using the structure of the common electrode block 180 and the sensing line 160, it is possible to sense the user's touch position on the X-Y coordinates plane through the use of sensing line 160 extending in one direction of the lower substrate 100.

In comparison with the LCD device with the sensing line 160 formed both in the X-axis direction and the Y-axis direction, the LCD device according to the present invention enables to simplify the structure and to reduce cost.

Referring again to FIG. 3, the sensing line 160 applies the electrical signal to the common electrode block 180, and simultaneously reduces resistance of the common electrode block 180.

Generally, the common electrode block 180 is formed of a transparent conductive material such as Indium-Tin-Oxide (ITO), wherein the transparent conductive material has high resistance. According as the common electrode block 180 is connected with the sensing line 160 which is formed of a metal material with high conductivity, it is possible to reduce the resistance of the common electrode block 180. For example, the sensing line 160 may be formed of any one selected among molybdenum (Mo), aluminum (Al) and copper (Cu), or their alloys.

The sensing line 160 may be formed in a direction parallel to the gate line 102 or the data line 104. According to the present invention, even though the sensing line 160 is formed in a direction parallel to the gate line 102 or the data line 104, it is possible to sense the user's touch position on the X-Y coordinates plane.

In order to prevent an aperture ratio from being lowered by the sensing line 160, it is preferable that the sensing line 160 formed parallel to the data line 104 overlap with the data line 104. Preferably, the sensing line 160 formed parallel to the gate line 102 overlaps with the gate line 102.

The common electrode contact hole 165 electrically connects the sensing line 160 with the common electrode block 180. That is, the sensing line 160 may be formed at the same layer as the pixel electrode 150. Thus, the sensing line 160 is electrically connected with the common electrode block 180 through the common electrode contact hole 165.

In this case, the common electrode contact hole 165 may be formed in a non-transmission area so as to prevent the aperture ratio from being lowered. The non-transmission area corresponds to the remaining area of pixel except an area for transmitting light, for example, the gate line 102 and the data line 104.

In FIG. 3, the common electrode contact hole 165 is positioned adjacent to the data line 104 and the source electrode 135, but not necessarily.

At least one slit 190 may be formed inside the pixel electrode 150 or common electrode block 180.

If the slit 190 is provided inside the pixel electrode 150 or common electrode block 180, a fringe field is formed between the pixel electrode 150 and the common electrode block 180 through the slit 190, whereby the liquid crystal is driven by the fringe field. That is, if is possible to realize a fringe field switching mode LCD device.

Figure 4:
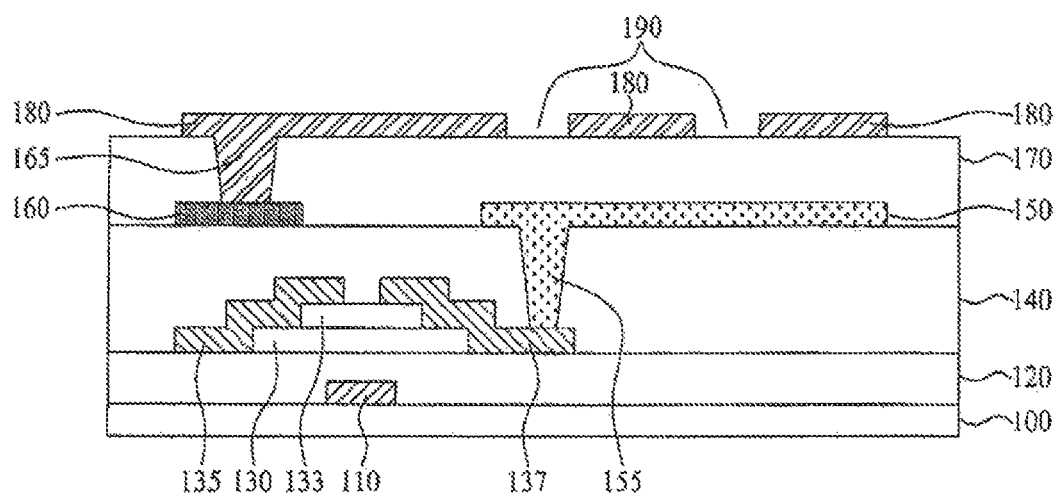
FIG. 4 is a cross sectional view showing one embodiment along B-B' of FIG. 3.

If the slit 190 is provided inside the common electrode block 180, the plurality of common electrode blocks 180 are formed on the pixel electrode 150 under the condition that a second passivation layer 170 is interposed between the common electrode block 180 and the pixel electrode 150 (See FIG. 4).

Figure 5:
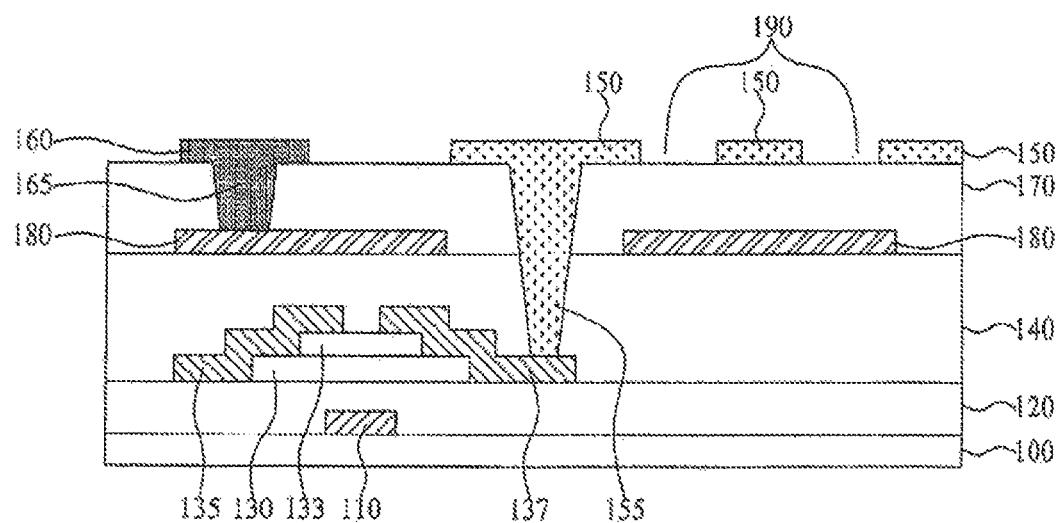
FIG. 5 is a cross sectional view showing another embodiment along B-B' of FIG. 3.

In contrast, if the slit 190 is provided inside the pixel electrode 150, the pixel electrode 150 is formed on the common electrode block 180 under the condition a second passivation layer 170 is interposed between the common electrode block 180 and the pixel electrode 150 (See FIG. 5).

The lower substrate 100 and the upper substrate 200 confronting each other are bonded to each other, and a liquid crystal layer is formed between the lower substrate 100 and the upper substrate 200.

The multiplexer (MUX) 300 is combined between the sensing line 160 and the sensing circuit 400 so as to decrease the number of sensing lines 160 input to the sensing circuit 400.

FIG. 2A illustrates an example showing the multiplexer 300 with 4:1 ratio, but not necessarily. For example, the multiplexer 300 with 8:1 ratio or 16:1 ratio may be used.

If using the multiplexer 300, it is possible to decrease the number of sensing lines 160 input to the sensing circuit 400, whereby a bezel width is decreased, or the aperture ratio is increased in the periphery.

The multiplexer 300 may be formed on the lower substrate 100 with the sensing line 160, may be provided inside a drive IC, or may be provided as an additional multiplexer chip.

The sensing circuit 400 may be directly connected with the sensing line 160 or connected with the multiplexer 300, whereby a touch sensing signal is generated when the user's touch is sensed.

Hereinafter, LCD devices according to the embodiments of the present invention will be described with reference to FIGS. 4 to 7 showing the cross sectional structures.

FIG. 4 is a cross sectional view showing one embodiment along B-B' of FIG. 3. As shown in FIG. 4, the LCD device according to the present invention includes a lower substrate 100, a gate electrode 110, a gate insulating film 120, a semiconductor layer 130, an etch stopper 133, a source electrode 135, a drain electrode 137, a first passivation layer 140, a pixel electrode 150, a sensing line 160, a second passivation layer 170, and a common electrode block 180. The LCD device according to the present invention is formed in a common electrode top structure where the common electrode block 180 is formed above the pixel electrode 150.

The lower substrate 100 may be formed of glass or transparent plastic.

The gate electrode 110 is formed on the lower substrate 100, wherein the gate electrode 110 is diverged from the gate line 102. The gate electrode 110 is formed of a conductive material.

The gate insulating film 120 is formed on the gate electrode 110, wherein the gate insulating layer 120 is formed of silicon oxide (SiOx) or silicon nitride (SiNx).

The semiconductor layer 130 is formed on a predetermined portion of the gate insulating film 120, wherein the semiconductor layer 130 is positioned above the gate electrode 110, Also, a channel is formed between the source electrode 135 and the drain electrode 137, wherein a current flows through the channel when a gate voltage is applied to the gate electrode 110. The semiconductor layer 130 may be formed of oxide or amorphous semiconductor.

The etch stopper 133 is formed on the semiconductor layer 130, to thereby protect the semiconductor layer 130. The etch stopper 133 may be formed of silicon oxide (SiOx) or silicon nitride (SiNx). If needed, it is possible to omit the etch stopper 133.

The source electrode 135 extends from the data line 104. The source electrode 135 is formed of a conductor with low resistance so as to minimize an operation delay of thin film transistor caused by a panel load.

The drain electrode 137 is formed on the semiconductor layer 130, wherein the drain electrode 137 is provided at a predetermined interval from the source electrode 135. The drain electrode 137 is formed of a conductor, and more particularly, a transparent conductor such as Indium-Tin-Oxide (ITO).

The first passivation layer 140 is formed on the source electrode 135 and the drain electrode 137, wherein the first passivation layer 140 is formed of silicon oxide (SiOx) or silicon nitride (SiNx).

The pixel electrode 150 is formed on the first passivation layer 140, wherein the pixel electrode 150 is formed of a transparent conductor such as Indium-Tin-Oxide (ITO). The pixel electrode 150 is electrically connected with the drain electrode 137 through a pixel electrode contact hole 155 formed in the first passivation layer 140.

The sensing line 160 is formed at the same layer as the pixel electrode 150, wherein the sensing line 160 is positioned at a predetermined interval from the pixel electrode 150. The sensing line 160 may be formed of any one selected among molybdenum (Mo), aluminum (Al) and copper (Cu), or their alloys.

The second passivation layer 170 is formed on the pixel electrode 150 and the sensing line 160, wherein the second passivation layer 170 is formed of silicon oxide (SiOx) or silicon nitride (SiNx).

The common electrode block 180 is formed on the second passivation layer 170, wherein the common electrode block 180 may be formed of a transparent conductor such as Indium-Tin-Oxide (ITO). The common electrode block 180 is electrically connected with the sensing line 160 through a common electrode contact hole 165 formed in the second passivation layer 170.

The common electrode block 180 is provided with a slit 190. Through the slit 190, a fringe field is formed between the pixel electrode 150 and the common electrode block whereby liquid crystal is driven by the fringe field, thereby realizing a fringe field switching mode LCD device.

FIG. 5 is a cross sectional view showing another embodiment along B-B' of FIG. 3. As shown in FIG. 5, the LCD device according to the present invention includes a lower substrate 100, a gate electrode 110, a gate insulating film 120, a semiconductor layer 130, an etch stopper 133, a source electrode 135, a drain electrode 137, a first passivation layer 140, a pixel electrode 150, a sensing line 160, a second passivation layer 170, and a common electrode block 180. The LCD device according to the present invention is formed in a pixel electrode top structure where the pixel electrode 150 is formed above the common electrode block 180. Except that the pixel electrode top structure, the LCD device of FIG. 5 is identical in structure to the LCD device of FIG. 4, whereby a detailed explanation for the same parts will be omitted.

According to the embodiment of FIG. 5, after forming the first passivation layer 140, the common electrode block 180 is formed thereon. In this case, the plurality of common electrode blocks 180 may be formed at fixed intervals, to thereby prevent the common electrode block 180 from being electrically short-circuited to the pixel electrode 150 at a position of a pixel electrode contact hole 155.

After the second passivation layer 170 is formed on the common electrode block 180, the pixel electrode contact hole 135 and common electrode contact hole 165 are formed. The sensing line 160 is electrically connected with the common electrode block 180 through the common electrode contact hole 165, and the pixel electrode 150 is electrically connected with the drain electrode 137 through the pixel electrode contact hole 155.

In this case, the pixel electrode 150 is provided with a slit 190. Through the slit 190, a fringe field is formed between the pixel electrode 150 and the common electrode block 180, whereby liquid crystal is driven by the fringe field, thereby realizing a fringe field switching mode LCD device.

LCD Device Manufactured by the Use of Halftone Mask

Hereinafter, other embodiments for a structure of forming pixel electrode 150 and sensing line 160 according to the present invention will be described with reference to FIGS. 6 and 7.

Figure 6:
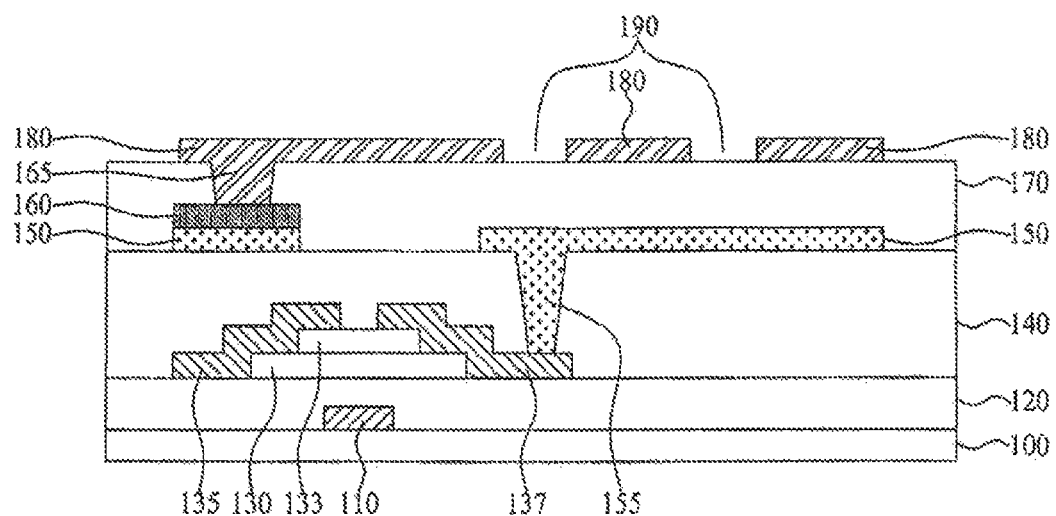
FIG. 6 is a cross sectional view showing another embodiment along B-B' of FIG. 3.

FIG. 6 is a cross sectional view showing another embodiment along B-B' of FIG. 3. As shown in FIG. 6, the LCD device according to the present invention includes a lower substrate 100, a gate electrode 110, a gate insulating film 120, a semiconductor layer 130, an etch stopper 133, a source electrode 135, a drain electrode 137, a first passivation layer 140, a pixel electrode 150, a sensing line 160, a second passivation layer 170, and a common electrode block 180. The LCD device according to the present invention is formed in a common electrode top structure where the common electrode block 180 is formed above the pixel electrode 150. Except that the pixel electrode 150 and the sensing line 160 are formed in a vertical structure, the LCD device of FIG. 6 is identical in structure to the LCD device of FIG. 4, whereby a detailed explanation for the same parts will be omitted.

According to the embodiment of FIG. 6, the pixel electrode 150 is formed under the sensing line 160. In this case, the sensing line 160 may be formed on the pixel electrode 150. However, the pixel electrode 150 overlapped with the sensing line 160 is electrically insulated from the pixel electrode 150 electrically connected with the drain electrode 137.

This structure may be obtained through steps of forming the pixel electrode 150 by a photolithography process, and then forming the sensing line 160 by another photolithography process. Instead, this structure may be obtained with efficiency by a photolithography process using a halftone mask.

That is, if the pixel electrode 150 and the sensing line 160 are simultaneously formed by the photolithography process using the halftone mask, it is possible to form the pixel electrode 150 and the sensing line 160 by using one mask instead of two masks, thereby simplifying the process.

According as an exposure process is carried out one time instead of two times, a tack time is decreased, and a cost for the exposure process is also decreased.

Figure 7:
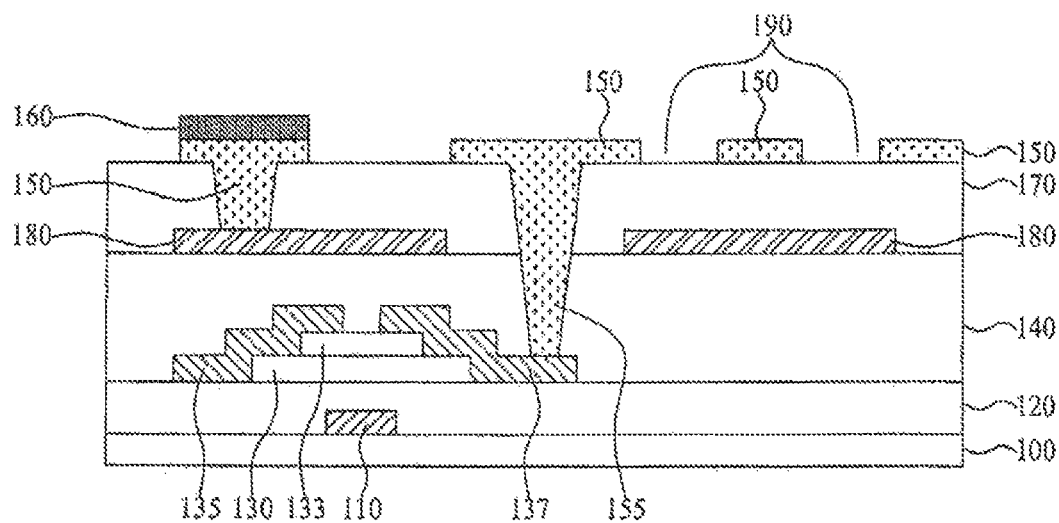
FIG. 7 is a cross sectional view showing another embodiment along B-B' of FIG. 3.

FIG. 7 is a cross sectional view showing another embodiment along B-B' of FIG. 3. As shown in FIG. 7, the LCD device according to the present invention includes a lower substrate 100, a gate electrode 110, a gate insulating film 120, a semiconductor layer 130, an etch stopper 133, a source electrode 135, a drain electrode 137, a first passivation layer 140, a pixel electrode 150, a sensing line 160, a second passivation layer 170, and a common electrode block 180. The LCD device according to the present invention is formed in a pixel electrode top structure where the pixel electrode 150 is formed above the common electrode block 180. Except that the pixel electrode 150 and the sensing line 160 are formed in a vertical structure, the LCD device of FIG. 7 is identical in structure to the LCD device of FIG. 5, whereby a detailed explanation for the same parts will be omitted.

According to the embodiment of FIG. 7, the pixel electrode 150 is formed under the sensing line 160. In this case, the sensing line 160 may be formed on the pixel electrode 150. However, the pixel electrode 150 overlapped with the sensing line 160 is electrically insulated from the pixel electrode 150 electrically connected with the drain electrode 137.

This structure may be obtained through steps of forming the pixel electrode 150 by a photolithography process, and then forming the sensing line 160 by another photolithography process. Instead, this structure may be obtained with efficiency by a photolithography process using a halftone mask.

That is, if the pixel electrode 150 and the sensing line 160 are simultaneously formed by the photolithography process using the halftone mask, it is possible to form the pixel electrode 130 and the sensing line 160 by using one mask instead of two masks, thereby simplifying the process.

According as an exposure process is carried out one time instead of two times, a tack time is decreased, and a cost for the exposure process is also decreased.

LCD Device with Blocking Layer

A process of manufacturing a liquid crystal panel is referred to as a cell process. The cell process may be largely divided into an alignment process of aligning liquid crystal in a predetermined direction between a lower substrate 100 with thin film transistors arranged thereon and an upper substrate 200 with color filters; a cell gap forming process of maintaining a predetermined gap by bonding the lower substrate 100 and the upper substrate 200 to each other; a cell cutting process, and a liquid crystal injecting process.

After forming a seal pattern 250 in the cell process, liquid crystal injection is carried out by vacuum and capillary phenomenon. This liquid crystal injection method needs ten or more hours. For shortening the time, a liquid crystal dispensing and vacuum-bonding apparatus may be used so as to simultaneously carry out processes of forming a liquid crystal layer and bonding the two substrates to each other.

Through the use of liquid crystal dispensing and vacuum-bonding apparatus, an army substrate with the seal pattern 250 of UV-curing sealant and a color filter substrate are positioned to confront each other, and then an appropriate amount of liquid crystal is dispensed onto any one of the array substrate and the color filter substrate under the vacuum atmosphere before bonding the two substrates to each other. Thereafter, the two substrates are aligned and then vacuum-bonded to each other. Simultaneously, the seal pattern 250 is irradiated with ultraviolet rays (UV), and is then cured, to thereby obtain a mother substrate of liquid crystal panels. The obtained mother substrate of liquid crystal panels is cut into unit liquid crystal panels, to thereby manufacture the unit liquid crystal panel in a short time.

As described above, since an opening for injection of liquid crystal is unnecessary for the liquid crystal panel manufactured by the use of liquid crystal dispensing and vacuum-bonding apparatus, the seal pattern 250 is continuously formed without opening.

However, in order to form the seal pattern 250, the seal pattern 250 of UV-curing sealant has to be irradiated with the ultraviolet rays (UV) so as to cure the UV-curing sealant. In this case, the semiconductor layer 130 of the transistor may be deteriorated by the ultraviolet rays.

In order to prevent the semiconductor layer 130 from being deteriorated, there is proposed an LCD device according to another embodiment of the present invention which includes a blocking layer 160a for blocking the ultraviolet rays, formed on the transistor. This proposed LCD device according to another embodiment of the present invention will be described in detail with reference to FIGS. 8 to 10.

Figure 8:
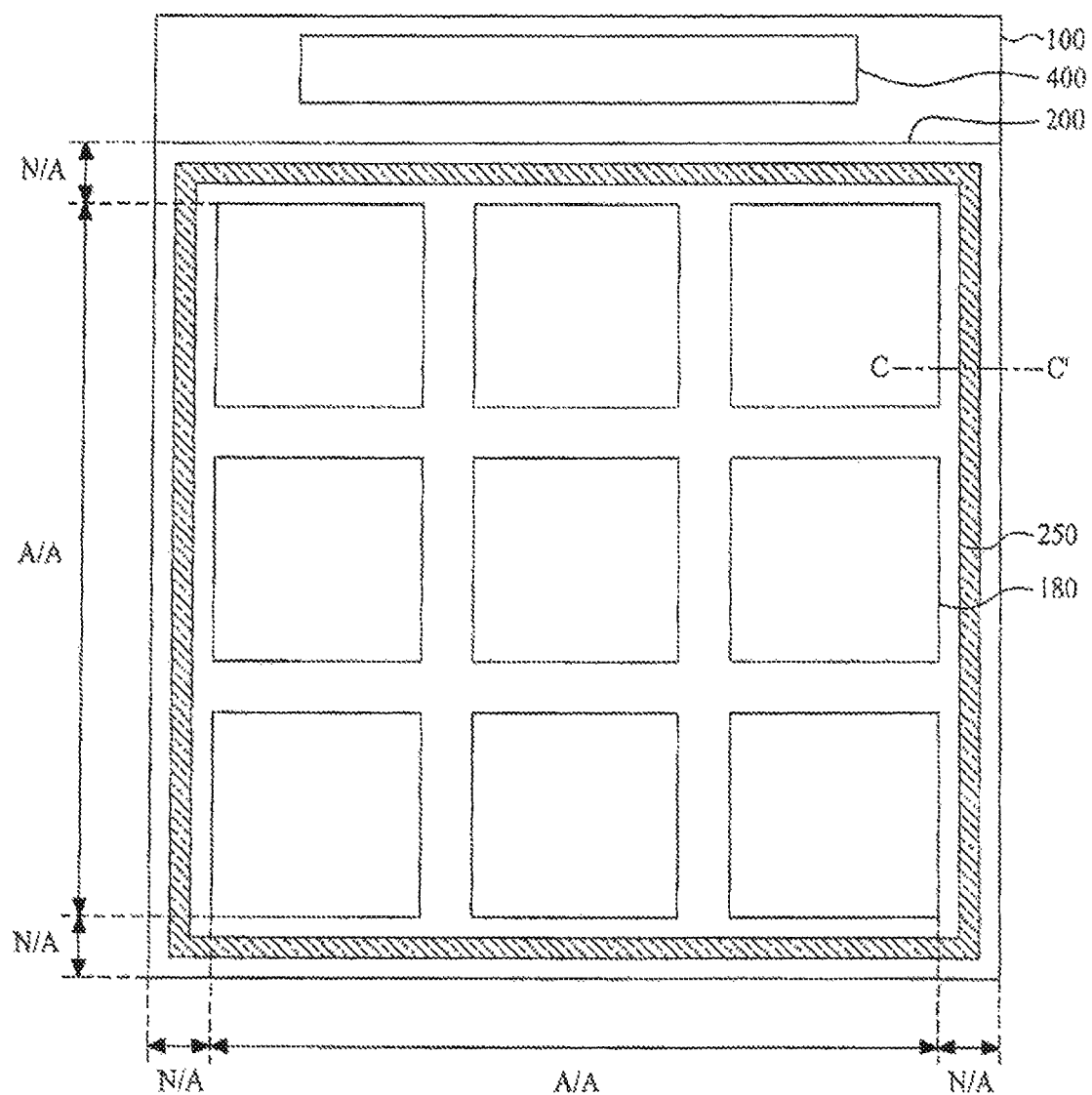
FIG. 8 illustrates an LCD device according to another embodiment of the present invention.

FIG. 8 illustrates an LCD device according to another embodiment of the present invention. As shown in FIG. 8, the LCD device according to another embodiment of the present invention includes a lower substrate 100, an upper substrate 200, an active area (A/A), a dummy area (N/A), a common electrode block 180, a seal pattern 250, and a sensing circuit 400.

On the lower substrate 100, there are gate and data lines 102 and 104, a plurality of transistors, a plurality of pixel electrodes 150, the plurality of common electrode blocks 180, the active area (A/A), and the dummy area (N/A). In this case, a plurality of pixels may be defined by the gate and data lines 102 and 104 crossing each other. Also, the plurality of transistors may be respectively formed in the pixels, and the pixel electrodes 150 may be respectively formed in the pixels. The common electrode block 180 and the pixel electrode 150 are formed at different layers, wherein the common electrode block 180, together with the pixel electrode 150, forms an electric field. Also, the plurality of common electrode blocks 180 are patterned to sense the user's touch. In the active area (A/A), there are a plurality of sensing lines 160 which are electrically connected with the common electrode blocks 180. The dummy area (N/A) is formed along the edge of the active area (A/A).

On the upper substrate 200, there is a black matrix 230 for preventing a light leakage. If needed, a color filter layer may be additionally formed on the upper substrate 200.

The sensing circuit 400 may be directly connected with the sensing line 160 or a multiplexer (not shown) so as to generate a touch sensing signal when a user's touch is sensed.

The seal pattern 250 is formed along the dummy area (N/A) in the edge of the lower and upper substrates 100 and 200, wherein the seal pattern 250 prevents the outflow of liquid crystal filled between the lower and upper substrates 100 and 200.

Figure 9:
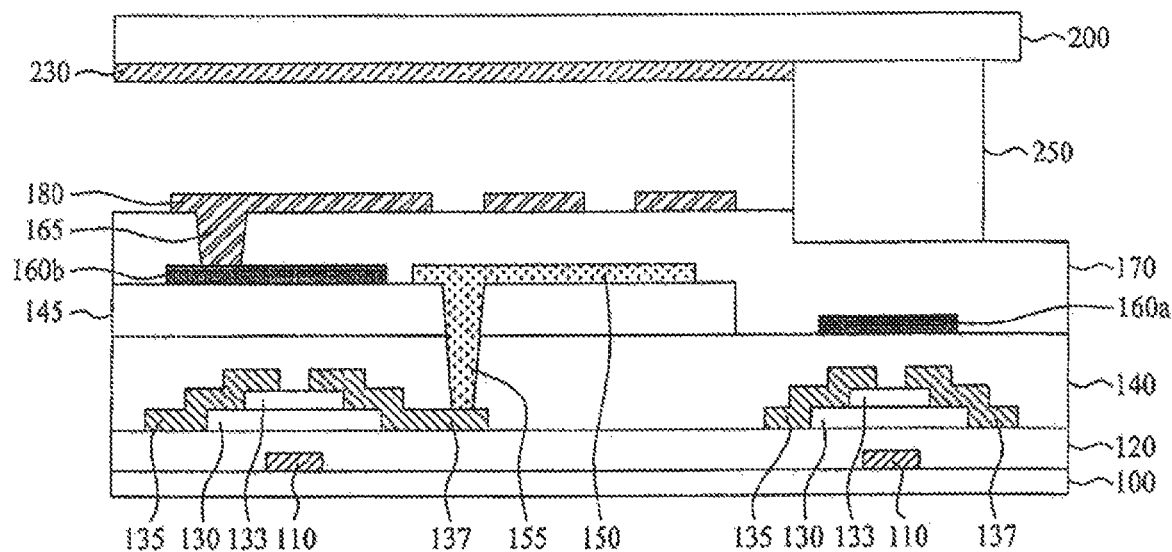
FIG. 9 is a cross sectional view showing one embodiment along C-C' of FIG. 8.

FIG. 9 is a cross sectional view showing one embodiment along C-C' of FIG. 8. As shown in FIG. 9, the LCD device according to one embodiment of the present invention includes a lower substrate 100, a gate electrode 110, a gate insulating film 120, a semiconductor layer 130, an etch stopper 133, a source electrode 135, a drain electrode 137, a first passivation layer 140, a pixel electrode 150, a sensing line 160b, a blocking layer 160a, a second passivation layer 170, a common electrode block 180, an upper substrate 200, a black matrix 230, and a seal pattern 250. The LCD device of FIG. 9 is formed in a common electrode top structure where the common electrode block 180 is formed above the pixel electrode 150.

The lower substrate 100 may be formed of glass or transparent plastic.

The gate electrode 110 is formed on the lower substrate 100, wherein the gate electrode 110 is diverged from the gate line 102. The gate electrode 110 is formed of a conductive material.

The gate insulating film 120 is formed on the gate electrode 110, wherein the gate insulating layer 120 is formed of silicon oxide (SiOx) or silicon nitride (SiNx).

The semiconductor layer 130 is formed on a predetermined portion of the gate insulating film 120, wherein the semiconductor layer 130 is positioned above the gate electrode 110. Also, a channel is formed between the source electrode 135 and the drain electrode 137, wherein a current flows through the channel when a gate voltage is applied to the gate electrode 110. The semiconductor layer 130 may be formed of oxide or amorphous semiconductor.

The etch stopper 133 is formed on the semiconductor layer 130, to thereby protect the semiconductor layer 130. The etch stopper 133 may be formed of silicon oxide (SiOx) or silicon nitride (SiNx). If needed, it is possible to omit the etch stopper 133.

The source electrode 135 extends from the data line 104. The source electrode 135 is formed of a conductor with low resistance so as to minimize an operation delay of thin film transistor caused by a panel load.

The drain electrode 137 is formed on the semiconductor layer 130, wherein the drain electrode 137 is provided at a predetermined interval from the source electrode 135. The drain electrode 137 is formed of a conductor, and more particularly, a transparent conductor such as Indium-Tin-Oxide (ITO).

The first passivation layer 140 is formed on the source electrode 135 and the drain electrode 137, wherein the first passivation layer 140 is formed of silicon oxide (SiOx) or silicon nitride (SiNx).

A third passivation layer 145 is formed in the active area (A/A) on the first passivation layer 140, wherein the third passivation layer 145 is formed of silicon oxide (SiOx) or silicon nitride (SiNx). If needed, it is possible to omit the third passivation layer 145.

The pixel electrode 150 is formed on the first passivation layer 140 or the third passivation layer 145, wherein the pixel electrode 150 is formed of a transparent conductor such as Indium-Tin-Oxide (ITO). The pixel electrode 150 is electrically connected with the drain electrode 137 through a pixel electrode contact hole 155.

The sensing line 160b is formed at the same layer as the pixel electrode 150, wherein the sensing line 160 is positioned at a predetermined interval from the pixel electrode 150. The sensing line 160 may be formed of any one selected among molybdenum (Mo), aluminum (Al) and copper (Cu), or their alloys.

In this case, the sensing line 160b is formed in a size corresponding to a size of the semiconductor layer 130 of the transistor formed below the sensing line 160b. That is, the sensing line 160b transfers a user's touch signal to the sensing circuit 400, and furthermore prevents deterioration of the semiconductor layer 130 by preventing ultraviolet rays from being incident on the semiconductor layer 130.

The blocking layer 160a is formed above the semiconductor layer 130 of the transistor in the dummy area (N/A), whereby it is possible to prevent deterioration of the semiconductor layer 130 by preventing ultraviolet rays from being incident on the semiconductor layer 130.

The blocking layer 160a and the sensing line 160b may be formed separately, that is, the blocking layer 160a may be formed by an additional process. The blocking layer 160a may be formed on the other layer instead of the first passivation layer 140. However, the blocking layer 160a may be formed of the same material as the sensing line 160b during a process for forming the sensing line 160b. That is, a process for forming the sensing line 160b and a process for forming the blocking layer 160a may be carried out at the same time, whereby it is possible to decrease process time and cost in comparison with those in a case of separately forming the sensing line 160b and the blocking layer 160a.

The transistor formed in the dummy area (N/A) includes, a transistor on a Gate-In-Panel (GIP) structure where a gate driving circuit is provided inside a panel, a transistor on an ESD structure for an electrostatic discharge, a transistor of an auto probe for a lighting test, and a transistor for an engineer test.

The second passivation layer 170 is formed on the pixel electrode 150 and the sensing line 160, wherein the second passivation layer 170 is formed of silicon oxide (SiOx) or silicon nitride (SiNx).

The common electrode block 180 is formed on the second passivation layer 170, wherein the common electrode block 180 may be formed of a transparent conductor such as Indium-Tin-Oxide (ITO). The common electrode block 180 is electrically connected with the sensing line 160 through a common electrode contact hole 165 formed in the second passivation layer 170.

The common electrode block 180 is provided with a slit 190. Through the slit 190, a fringe field is formed between the pixel electrode 150 and the common electrode block 180, whereby liquid crystal is driven by the fringe field, thereby realizing a fringe field switching mode LCD device.

The blade matrix 230 is formed on the upper substrate 200, wherein the black matrix 230 is positioned in a region for preventing a light leakage except a pixel region of the lower substrate 100.

The seal pattern 250 is formed in the edge of the lower and upper substrates 100 and 200, to thereby prevent a leakage of liquid crystal layer.

Figure 10:
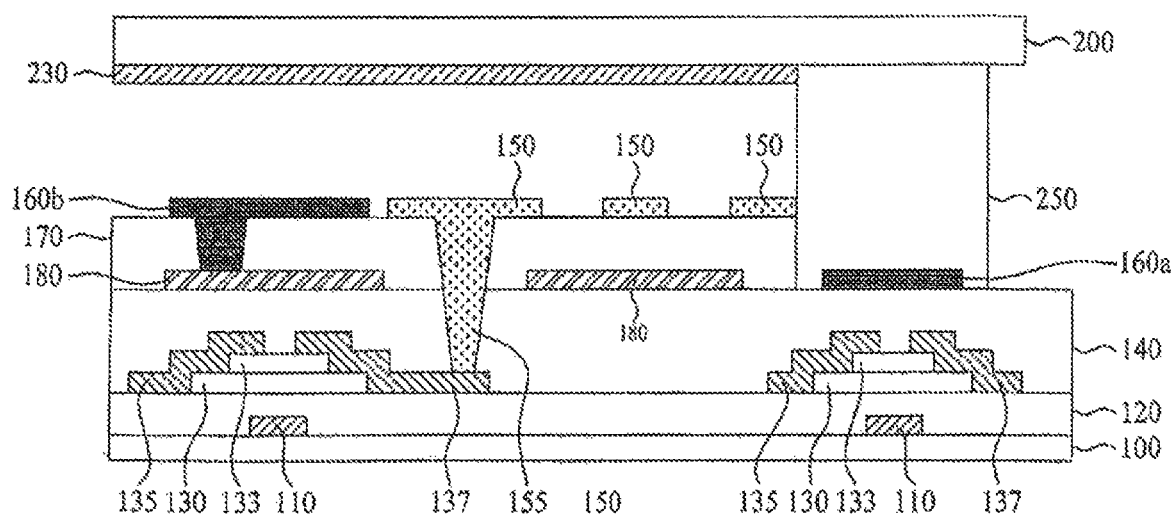
FIG. 10 is a cross sectional view showing another embodiment along C-C' of FIG. 8.

FIG. 10 is a cross sectional view showing another embodiment along C-C' of FIG. 8. As shown in FIG. 10, the LCD device according to another embodiment of the present invention includes a lower substrate 100, a gate electrode 110, a gate insulating film 120, a semiconductor layer 130, an etch stopper 133, a source electrode 135, a drain electrode 137, a first passivation layer 140, a pixel electrode 150, a sensing line 160b, a blocking layer 160a, a second passivation layer 170, a common electrode block 180, an upper substrate 200, a black matrix 230, and a seal pattern 250. The LCD device of FIG. 10 is formed in a pixel electrode top structure where the pixel electrode 150 is formed above the common electrode block 180. Herein, a detailed explanation for the parts repeated in FIG. 9 will be omitted.

After forming the common electrode block 180 on the first passivation layer 140, the second passivation layer 170 is formed on the common electrode block 180. FIG. 10 illustrates that the second passivation layer 170 is positioned inside the liquid crystal panel with reference to the seal pattern 250, but not necessarily. The second passivation layer 170 may be formed at the lower side of the seal pattern 250.

In the second passivation layer 170, there are a common electrode contact hole 165 for electrically connecting the sensing line 160b and the common electrode block 180 with each other, and a pixel electrode contact hole 155 for electrically connecting the drain electrode 137 and the pixel electrode 150 with each other.

The sensing line 160b is formed on the second passivation layer 170, wherein the sensing line 160b is electrically connected with the common electrode block 180. Also, the pixel electrode 150 being electrically connected with the drain electrode 137 is formed on the second passivation layer 170. In this case, the pixel electrode 150 is provided with a slit 190. Through the slit 190, a fringe field is formed between the pixel electrode 150 and the common electrode block 180, whereby liquid crystal is driven by the fringe field, thereby realizing a fringe field switching mode LCD device.

Method for Manufacturing LCD Device

Figure 11A:
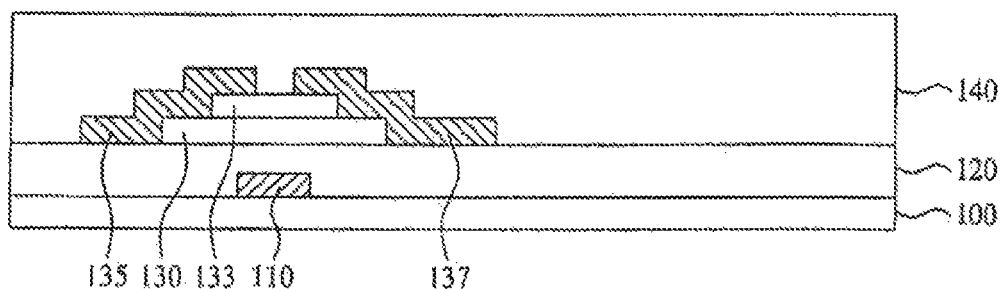
FIGS. 11A to 11C are cross sectional views showing a process for manufacturing the lower substrate for the LCD device according to one embodiment of the present invention.
Figure 11B:
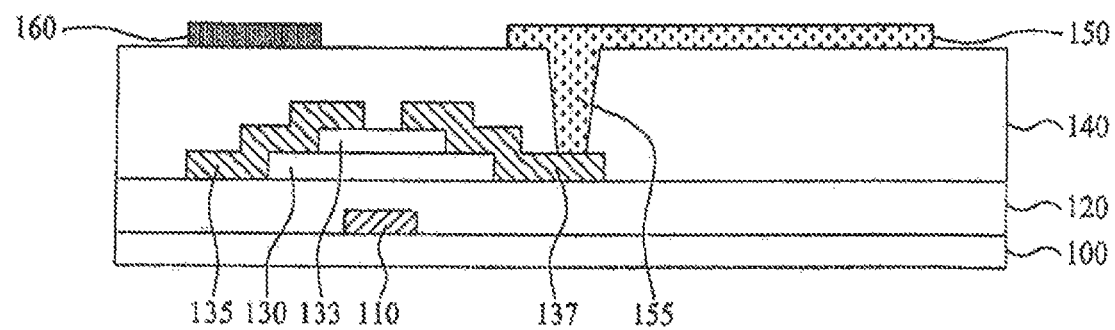
Figure 11C:
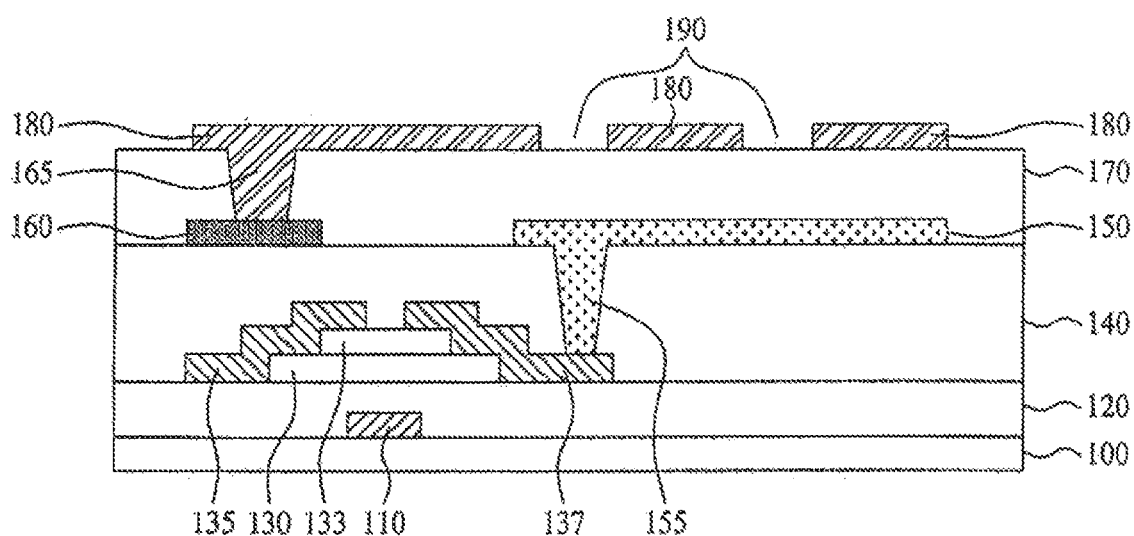

FIGS. 11A to 11C are cross sectional views showing a process for manufacturing the lower substrate for the LCD device according to one embodiment of the present invention.

As shown in FIG. 11A, the gate electrode 110, the gate insulating film 120, the semiconductor layer 130, the etch stopper 133, the source electrode 135, the drain electrode 137, and the first passivation layer 140 are sequentially formed on the lower substrate 100. Although not shown, the gate line 102 and the data line 104 are formed on the lower substrate 100.

As shown in FIG. 11B, after the pixel electrode contact hole 155 is formed on the first passivation layer 140, the pixel electrode 150 is formed while being electrically connected with the drain electrode 137. Also, the sensing line 160 is formed on the predetermined portion of the first passivation layer 140.

The sensing line 160 may be formed in a direction parallel to the gate line 102 or the data line 104. According to the present invention, even though the sensing line 160 is formed in a direction parallel to the gate line 102 or the data line 104, it is possible to sense the user's touch position on the X-Y coordinates plane.

In order to prevent the aperture, ratio from being lowered by the sensing line 160, it is preferable that the sensing line 160 formed parallel to the data line 104 overlap with the data line 104. Preferably, the sensing line 160 formed parallel to the gate line 102 overlaps with the gate line 102.

As shown in FIG. 11C, after the second passivation layer 170 is formed on the pixel electrode 150 and the sensing line 160, the common electrode contact hole 165 is formed to electrically connect the sensing line 160 and the common electrode block 180 to each other.

By adjusting the position of the common electrode contact hole 165, when the sensing line 160 is electrically connected with one of the common electrode blocks 180, the sensing line 160 is insulated from the remaining common electrode blocks 180.

The common electrode block 180 is formed on the second passivation layer 170, to thereby electrically connect the sensing line 160 and the common electrode block 180 to each other.

In order to use the common electrode block 180 as the sensing electrode, the plurality of common electrode blocks 180 are patterned. The plurality of common electrode blocks 180 may be formed in a size corresponding to a size of one or more pixels. Herein, the size of common electrode blocks 180 deeply affects touch resolution of the LCD device. That is, the touch resolution of the LCD device is highly affected by the number of pixels to be corresponding to the size of common electrode blocks 180.

Method for Manufacturing LCD Device by the Use of Halftone Mask

FIGS. 12A to 12D are cross sectional views showing a process for manufacturing the lower substrate for the LCD device according to another embodiment of the present invention. Herein, only non-repeated parts, which are not described in FIGS. 11A to 11C, will be chiefly described in detail.

Figure 12A:
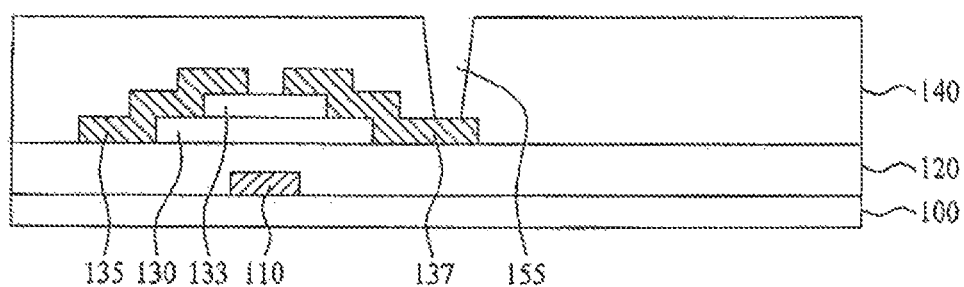
FIGS. 12A to 12D are cross sectional views showing a process for manufacturing the lower substrate for the LCD device according to another embodiment of the present invention.

First, as shown in FIG. 12A, the gate electrode 110, the gate insulating film 120, the semiconductor layer 130, the etch stopper 133, the source electrode 135, the drain electrode 137, and the first passivation layer 140 are sequentially formed on the lower substrate 100. Then, the pixel electrode contact hole 155 is formed on the first passivation layer 140.

Figure 12B:
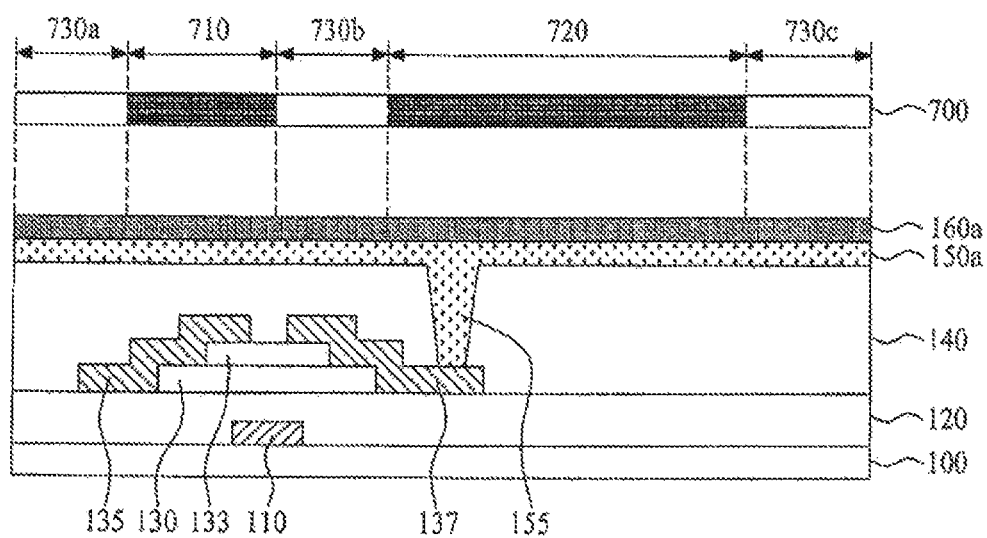

As shown in FIG. 12B, a pixel electrode layer 150a and a sensing line layer 140a are sequentially formed on the first passivation layer 140.

Then, a photoresist is deposited on the pixel electrode layer 150a and the sensing line layer 140a, and the deposited photoresist is irradiated with light through the use of half-tone mask 700. In this case, the halftone mask includes a non-transmission area 710 through which light does not penetrate, a semi-transmission area 720 through which some of light penetrate, and a transmission area 730a, 730b and 730c through which light penetrates totally.

Thereafter, the photoresist is developed to thereby form a photoresist pattern. The photoresist pattern is provided in such a manner that the photoresist layer corresponding to the non-transmission area 710 of the halftone mask remains as it is, the photoresist layer corresponding to the semi-transmission area 720 of the halftone mask remains partially, and the photoresist layer corresponding to the transmission area 730a, 730b and 730c is completely removed.

Figure 12C:
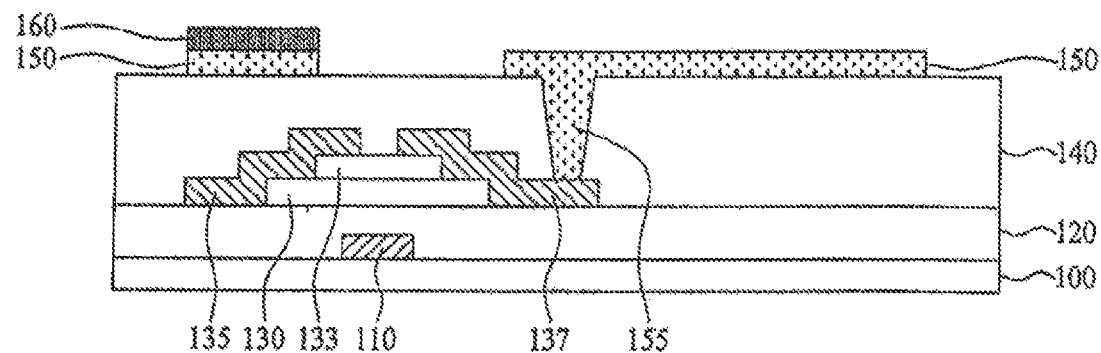

As shown in FIG. 12C, under the condition that the photoresist pattern is used as a mask, the pixel electrode layer 150a and the sensing line layer 140a are etched. After ashing the photoresist pattern, the etching process is carried out again, and then the photoresist pattern is removed.

If the pixel electrode 150 and the sensing line 160 are formed in the aforementioned method, it is possible to carry out the light-irradiation process once, to thereby decrease the manufacturing time and cost.

Figure 12D:
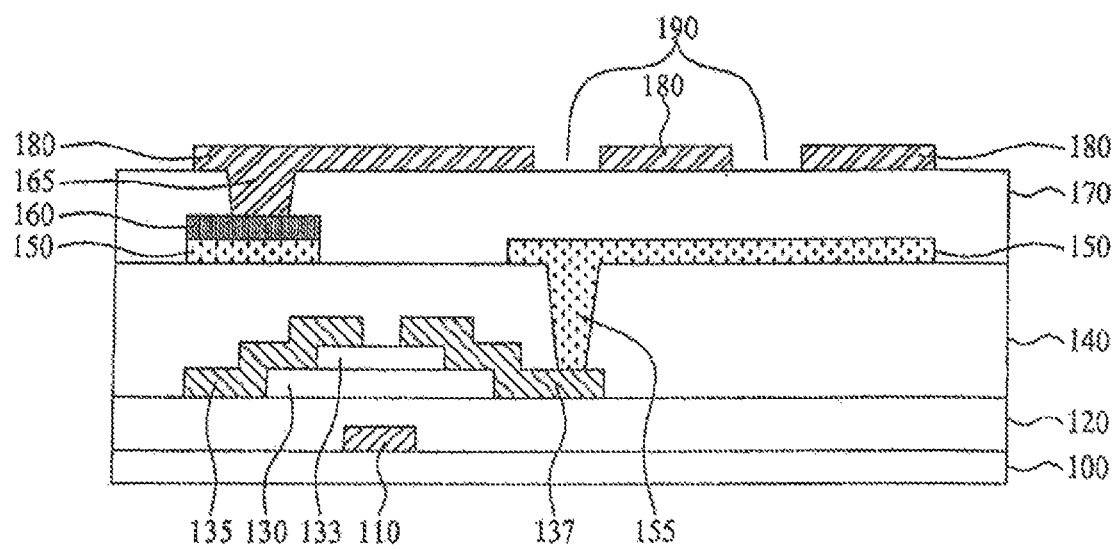

As shown in FIG. 12D, the second passivation layer 170 is formed on the pixel electrode 150 and the sensing line 160, and then the common electrode block 180 is patterned on the second passivation layer 170.

Method for Manufacturing LCD Device with Blocking Layer

FIGS. 13A to 13D are cross sectional views showing a process for manufacturing the lower substrate for the LCD device according to another embodiment of the present invention. Herein, only non-repeated parts, which are not described in FIGS. 11A to 11C, will be chiefly described in detail.

Figure 13A:
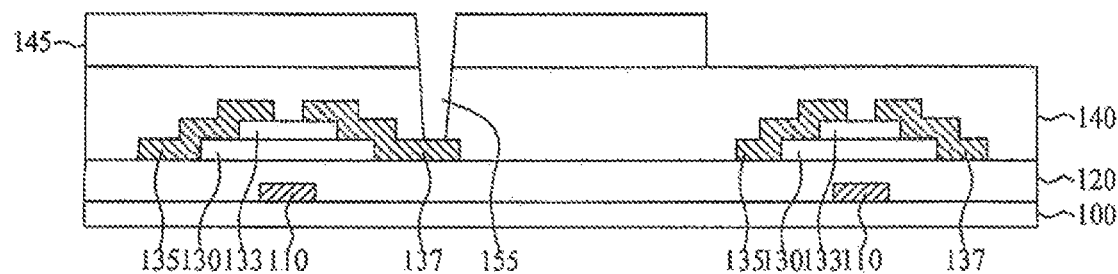
FIGS. 13A to 13D are cross sectional views showing a process for manufacturing the lower substrate for the LCD device according to another embodiment of the present invention.

First, as shown in FIG. 13A, the gate electrode 110, the gate insulating film 120, the semiconductor layer 130, the etch stopper 133, the source electrode 135, the drain electrode 137, the first passivation layer 140, and the third passivation layer 145 are sequentially formed on the lower substrate 100. Then, the pixel electrode contact hole 155 is formed in the first passivation layer 140 and the third passivation layer 145.

Figure 13B:
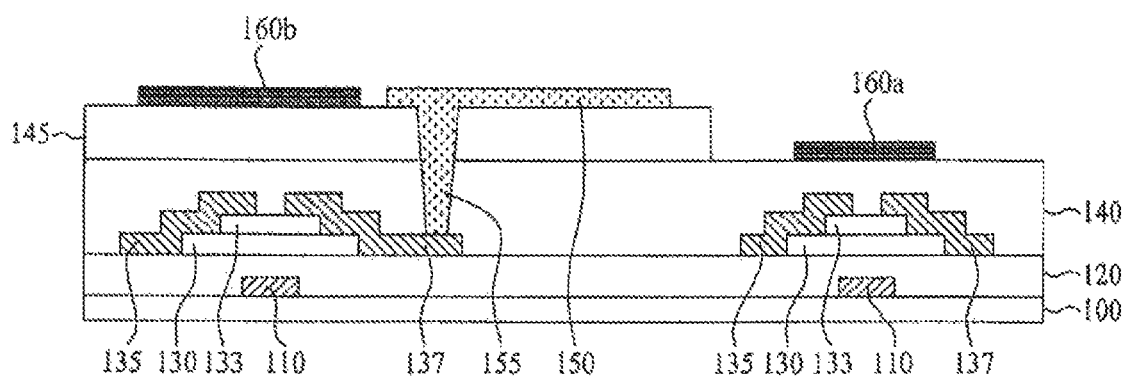

As shown in FIG. 13B, the pixel electrode 150 is patterned on the third passivation layer 145, wherein the pixel electrode 150 is electrically connected with the drain electrode 137. After that, the sensing line 160b is formed on the third passivation layer 145. Also, the blocking layer 160a is formed on the first passivation layer 140.

Each of the sensing line 160b and the blocking layer 160a is provided in the size corresponding to that of the semiconductor layer 130 formed therebelow, to thereby prevent the ultraviolet rays irradiated from the upper side from being incident on the semiconductor layer 130.

Figure 13C:
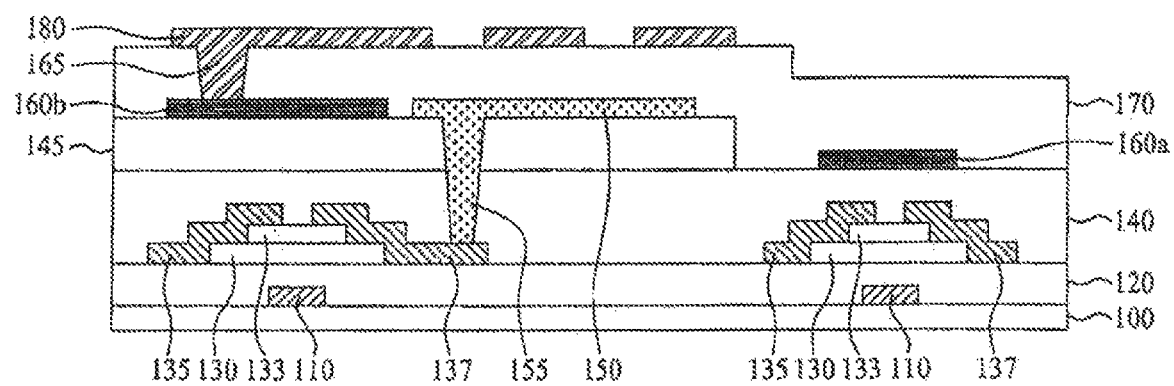

As shown in FIG. 13C, the second passivation layer 170 is formed on the pixel electrode 150, the sensing line 160b, and the blocking layer 160a, and the common electrode contact hole 165 is formed to electrically connect the sensing line 160b and the common electrode block 180 with each other.

Figure 13D:
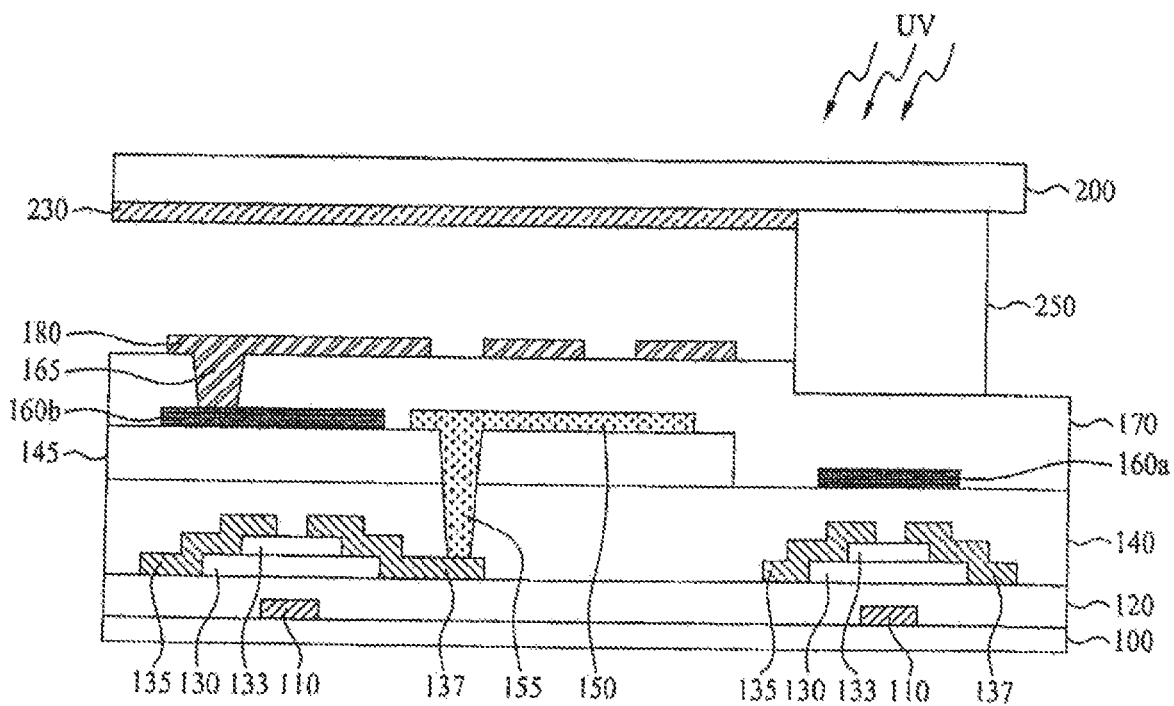

Then, as shown in FIG. 13D, the lower substrate 100 and the upper substrate 200 confronting each other are bonded to each other, and the liquid crystal layer is formed by injecting liquid crystal into the space between the lower substrate 100 and the upper substrate 200, and is then cured by irradiation of ultraviolet rays, to thereby form the seal pattern 250.

According as the blocking layer 160a and the sensing line 160b are formed on the semiconductor layer 130, it is possible to prevent the semiconductor layer 130 from being deteriorated by the ultraviolet rays.

Figure 14:
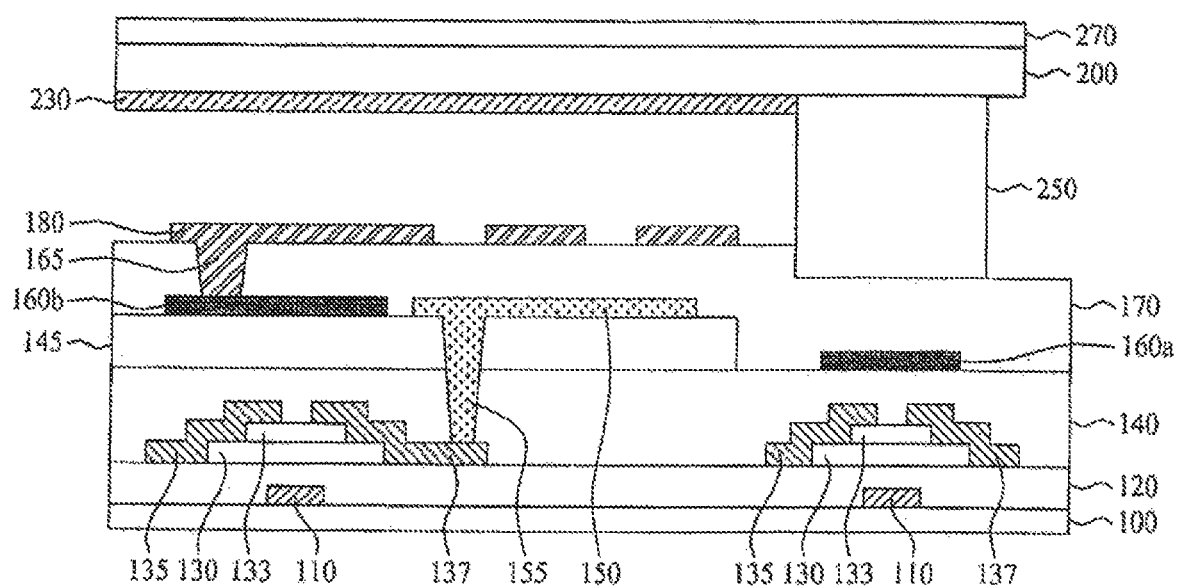
FIG. 14 is a cross sectional view showing another embodiment along C-C' of FIG. 8.

Method for Manufacturing LCD Device with High-Resistance Conductive Layer on Rear Surface of Upper Substrate FIG. 14 is a cross sectional view showing another embodiment along C-C' of FIG. 8. As shown in FIG. 14, the LCD device according to another embodiment of the present invention includes the lower substrate 100, the gate electrode 110, the gate insulating film 120, the semiconductor layer 130, the etch stopper 133, the source electrode 135, the drain electrode 137, the first passivation layer 140, the pixel electrode 150, the sensing line 160b, the blocking layer 160a, the second passivation layer 170, the common electrode block 180, the upper substrate 200, the black matrix 230, the seal pattern 250, and a high-resistance conductive layer 270. The LCD device according to the present invention is formed in a common electrode top structure where the common electrode block 180 is formed above the pixel electrode 150. Herein, a detailed explanation for the same parts as those of FIG. 9 will be omitted.

The high-resistance conductive layer 270 is formed on the rear surface of the upper substrate 200. The high-resistance conductive layer 270 is formed a transparent conductive material with optical transparency for penetrating light emitted from the liquid crystal panel, and electrical conductivity for grounding (GND) electric charges formed in the lower substrate 100 by static electricity toward a ground pad (not shown). In order to enhance the function of sensing the user's touch position, the high-resistance conductive layer 270 may have high resistance (for example, 50 MΩ/sqr~5 GΩ/sqr).

The high-resistance conductive layer 270 enables to discharge the electric charges from the liquid crystal panel into the ground (GND), to thereby improve ESD shielding efficiency of the LCD device with touch screen provided therein.

That is, as mentioned above, since the high-resistance conducive layer 270 is formed of the high-resistance material with the above resistance value of 50 MΩ/sqr~5 GΩ/sqr, it is possible to prevent, a phenomenon of shielding influence of user finger, to thereby improve touch sensing efficiency of the LCD device with touch screen provided therein.

Accordingly, the LCD device according to the present invention uses the common electrode, provided for formation of the electric field to drive the liquid crystal, as the sensing electrode. That is, there is no need for the additional touch screen of the related art on the upper surface of the liquid crystal panel. Thus, the present invention enables to decrease the total thickness of the device, to simplify the manufacturing process, and to decrease the manufacturing cost.

According to the present invention, the user's touch position is sensed on the X-Y coordinates plane through the use of sensing line formed in only one direction of the lower substrate. Thus, in comparison with the related art LCD device with the sensing lines provided in the X-axis direction and the Y-axis direction, the LCD device according to the present invention is provided with the simplified structure, to thereby decrease the manufacturing cost.

According to the present invention, it is possible to decrease the number of sensing lines input to the sensing circuit by the use of multiplexer (MUX), whereby the bezel width is decreased, or the aperture ratio is increased in the periphery.

According to the present invention, the sensing line and the pixel electrode are patterned by one mask process, thereby decreasing the/manufacturing time and cost.

According to the present invention, the blocking layer for blocking ultraviolet rays is formed on the semiconductor layer, to thereby prevent the semiconductor layer from being deteriorated by the ultraviolet rays.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
   a pixel electrode;
   a first touch sensing electrode insulated from the pixel electrode;
   a first sensing line electrically connected with the first touch sensing electrode;
   an insulating layer between the first sensing line and the first touch sensing electrode, the first sensing line being connected to the first touch sensing electrode via a first contact hole thorough the insulating layer; and
   a sensing circuit electrically connected with the first sensing line, wherein an electrical signal is applied to the first touch sensing electrode via the first sensing line, and the sensing circuit is configured to detect a touch from the first touch sensing electrode via the first sensing line.

2. The display device of claim 1, further comprising:
   a second touch sensing electrode spaced apart from the first touch sensing electrode; and
   a second sensing line spaced apart from the first sensing line and electrically connected with the second touch sensing electrode,
   wherein the sensing circuit is electrically connected with the second sensing line, an electrical signal is applied to the second touch sensing electrode via the second sensing line, and the sensing circuit is configured to detect a touch from the second touch sensing electrode via the second sensing line.

3. The display device of claim 2, wherein at least one of the first touch sensing electrode and the second touch sensing electrode overlaps both the first sensing line and the second sensing line.

4. The display device of claim 2, further comprising:
   a multiplexer electrically connected with the first sensing line and the second sensing line and configured to provide the electrical signal from the sensing circuit to the first sensing line and the second sensing line, wherein the sensing circuit is electrically connected with the multiplexer and is further configured to detect the touch from the first touch sensing electrode and the second touch sensing electrode via the first sensing line and the second sensing line, respectively, and the multiplexer.

5. The display device of claim 4, wherein:
the second sensing line is connected to the second touch sensing electrode via a second contact hole through the insulating layer, and
a length of the first sensing line from the multiplexer to the first contact hole is different from a length of the second sensing line from the multiplexer to the second contact hole.

6. The display device of claim 1,
wherein the first sensing line has a protrusion adjacent to the contact hole.

7. The display device of claim 1, further comprising:
a connection electrode in the first contact hole and connecting the first sensing line with the first touch sensing electrode,
wherein the connection electrode is formed of a same material as the pixel electrode.

8. The display device of claim 1, further comprising:
a thin film transistor electrically connected to the pixel electrode and having a source electrode,
wherein the first contact hole is adjacent to the source electrode.

9. The display device of claim 1, wherein at least one of the pixel electrode and the first touch sensing electrode includes a slit.

10. The display device of claim 1, further comprising a transparent, high-resistance conductive layer at an outer surface of the display device.

11. The display device of claim 10, wherein:
the outer surface of the display device is a touch surface of the display device, and
the transparent, high-resistance conductive layer has a resistance value of 50 MΩ/sqr or higher.

12. A display apparatus, comprising:
a plurality of touch sensing electrodes;
a plurality of sensing lines, each electrically connected with a corresponding one of the plurality of touch sensing electrodes;
a multiplexer electrically connected to the plurality of sensing lines and configured to provide an electrical signal to the plurality of touch sensing electrodes via the plurality of sensing lines; and
a sensing circuit electrically connected to the multiplexer and configured to detect a touch from the plurality of touch sensing electrodes via the plurality of sensing lines and the multiplexer.

13. The display apparatus of claim 12, wherein at least one of the plurality of touch sensing electrodes overlaps with each of the plurality of sensing lines.

14. The display apparatus of claim 12, further comprising:
an insulating layer between a first sensing line among the plurality of sensing lines and a first touch sensing electrode among the plurality of touch sensing electrodes, the first sensing line being connected to the first touch sensing electrode via a first contact hole thorough the insulating layer.

15. The display apparatus of claim 14,
wherein the first sensing line has a protrusion adjacent the first contact hole.

16. The display apparatus of claim 14, further comprising:
a pixel electrode insulated from the first touch sensing electrode; and
a connection electrode in the first contact hole and connecting the first sensing line with the first touch sensing electrode,
wherein the connection electrode is formed of a same material as the pixel electrode.

17. The display apparatus of claim 14, further comprising:
a pixel electrode insulated from the first touch sensing electrode; and
a thin film transistor electrically connected to the pixel electrode and having a source electrode,
wherein the first contact hole is adjacent to the source electrode.

18. The display apparatus of claim 12, further comprising a pixel electrode overlapping one of the plurality of touch sensing electrodes,
wherein at least one of the pixel electrode and the one of the plurality of touch sensing electrodes includes a slit.

19. The display apparatus of claim 12, further comprising a transparent, high-resistance conductive layer at an outer surface of the display apparatus.

20. The display apparatus of claim 19, wherein:
the outer surface of the display apparatus is a touch surface of the display apparatus, and
the transparent, high-resistance conductive layer has a resistance value of 50 MΩ/sqr or higher.

21. The display apparatus of claim 14, wherein:
a second sensing line among the plurality of sensing lines is connected to a second touch sensing electrode among the plurality of touch sensing electrodes via a second contact hole through the insulating layer, and
a length of the first sensing line from the multiplexer to the first contact hole is different from a length of the second sensing line from the multiplexer to the second contact hole.

22. The display apparatus of claim 14, further comprising:
a data line overlapping with the first touch sensing electrode.

23. The display apparatus of claim 12, wherein the sensing circuit is further configured to provide the electrical signal to the multiplexer.

24. The display apparatus of claim 12, wherein:
the plurality of touch sensing electrodes include a first touch sensing electrode and a second touch sensing electrode;
the plurality of touch sensing lines include a first touch sensing line and a second touch sensing line;
the second touch sensing electrode is spaced apart from the first touch sensing electrode;
the first sensing line is electrically connected with the first touch sensing electrode;
the second sensing line is spaced apart from the first sensing line and is electrically connected with the second touch sensing electrode;
the first sensing line overlaps with the first touch sensing electrode and the second touch sensing electrode, the first sensing line not overlapping with the second sensing line within areas of the display apparatus overlapping with the first touch sensing electrode and the second touch sensing electrode in a plan view;
the second sensing line overlaps with the second touch sensing electrode; and
the first sensing line does not directly contact the second touch sensing electrode and is not electrically connected to the second touch sensing electrode through any contact hole overlapping with the second touch sensing electrode in the plan view.

25. The display device of claim 1, further comprising:
a data line overlapping with the first touch sensing electrode.

26. The display device of claim 1, further comprising:
a data line parallel to the first sensing line.

27. The display device of claim 1, further comprising:
a second touch sensing electrode spaced apart from the first touch sensing electrode; and
a second sensing line spaced apart from the first sensing line and electrically connected with the second touch sensing electrode,
wherein the first sensing line overlaps with the first touch sensing electrode and the second touch sensing electrode, the first sensing line not overlapping with the second sensing line within areas of the display device overlapping with the first touch sensing electrode and the second touch sensing electrode in a plan view,
wherein the second sensing line overlaps with the second touch sensing electrode, and
wherein the first sensing line does not directly contact the second touch sensing electrode and is not electrically connected to the second touch sensing electrode through any contact hole overlapping with the second touch sensing electrode in the plan view.

* * * * *